(12) United States Patent
White, Jr. et al.

(10) Patent No.: US 11,907,670 B1
(45) Date of Patent: Feb. 20, 2024

(54) MODELING COMMUNICATION DATA STREAMS FOR MULTI-PARTY CONVERSATIONS INVOLVING A HUMANOID

(71) Applicant: Cisco Technology, Inc., San Jose, CA (US)

(72) Inventors: David C. White, Jr., St. Petersburg, FL (US); Christopher Shaun Roberts, Spring, TX (US); Magnus Mortensen, Cary, NC (US); Jay Kemper Johnston, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 165 days.

(21) Appl. No.: 17/034,585

(22) Filed: Sep. 28, 2020

Related U.S. Application Data

(60) Provisional application No. 63/051,560, filed on Jul. 14, 2020.

(51) Int. Cl.
  *G06F 40/35* (2020.01)
  *H04L 51/02* (2022.01)

(52) U.S. Cl.
  CPC .............. *G06F 40/35* (2020.01); *H04L 51/02* (2013.01)

(58) Field of Classification Search
  CPC ...... G06F 40/30; G06F 40/35; G06F 16/3329; G06F 16/00; G06F 16/243; G06F 40/20; H04L 51/02
  See application file for complete search history.

(56) References Cited

U.S. PATENT DOCUMENTS

| | | |
|---|---|---|
| 10,410,626 B1 | 9/2019 | Sherstinsky et al. |
| 2006/0155765 A1 | 7/2006 | Takeuchi et al. |
| 2007/0050191 A1 | 3/2007 | Weider et al. |
| 2007/0203863 A1 | 8/2007 | Gupta et al. |
| 2009/0162824 A1 | 6/2009 | Heck |
| 2009/0245500 A1 | 10/2009 | Wampler |

(Continued)

FOREIGN PATENT DOCUMENTS

| | | |
|---|---|---|
| CN | 109783510 A | 5/2019 |
| WO | 2019144773 A1 | 8/2019 |
| WO | 2019184103 A1 | 10/2019 |

OTHER PUBLICATIONS

Zendesk, "Answer Bot", retrieved from Internet Jan. 27, 2021, 7 pages; https://www.zendesk.com/answer-bot/.

(Continued)

*Primary Examiner* — Wilson W Tsui
(74) *Attorney, Agent, or Firm* — Edell, Shapiro & Finnan, LLC

(57) ABSTRACT

A computer executed process for mimicking human dialog, referred to herein as a "humanoid" or "humanoid process software," can be configured to participate in multi-party conversations. The humanoid can monitor electronic communications in a conversation involving the humanoid and at least one other party. The humanoid can model the electronic communications by uniquely identifying each of the electronic communications as a stream of data. For example, the data can be labeled and sorted in a database and/or arranged in a nodal graph representation. The humanoid can participate in the conversation based on the modeling.

22 Claims, 13 Drawing Sheets

(56) References Cited

U.S. PATENT DOCUMENTS

| | | |
|---|---|---|
| 2013/0218339 A1 | 8/2013 | Maisonnier et al. |
| 2014/0019879 A1* | 1/2014 | Krajec ................. G06F 3/0481 |
| | | 715/753 |
| 2014/0258286 A1 | 9/2014 | Brown et al. |
| 2016/0162474 A1 | 6/2016 | Agarwal et al. |
| 2016/0247068 A1 | 8/2016 | Lin |
| 2017/0048170 A1* | 2/2017 | Smullen ................. H04L 67/02 |
| 2017/0111364 A1* | 4/2017 | Rawat .................... G06F 21/316 |
| 2017/0120446 A1 | 5/2017 | Veltrop et al. |
| 2017/0308531 A1 | 10/2017 | Ma et al. |
| 2018/0025726 A1* | 1/2018 | Gatti de Bayser ..... H04L 51/02 |
| | | 704/257 |
| 2018/0131645 A1* | 5/2018 | Magliozzi ............... H04L 51/02 |
| 2018/0145934 A1* | 5/2018 | Pappu .................. H04L 12/1822 |
| 2018/0332170 A1 | 11/2018 | Li et al. |
| 2018/0367483 A1* | 12/2018 | Rodriguez ............ H04L 51/046 |
| 2019/0042988 A1 | 2/2019 | Brown et al. |
| 2019/0121853 A1* | 4/2019 | Cai ....................... G06N 3/0454 |
| 2019/0171845 A1* | 6/2019 | Dotan-Cohen ....... H04L 63/205 |
| 2020/0125678 A1* | 4/2020 | Conley .................... G06N 5/02 |
| 2020/0259891 A1* | 8/2020 | Abraham ............ H04L 67/1008 |
| 2020/0293946 A1 | 9/2020 | Sachan et al. |
| 2020/0302123 A1* | 9/2020 | Mittal .................... G06F 40/40 |
| 2020/0329144 A1 | 10/2020 | Morgan et al. |
| 2020/0335124 A1* | 10/2020 | Herzig ................ G06F 16/9024 |
| 2021/0073653 A1 | 3/2021 | Maes |
| 2021/0158146 A1 | 5/2021 | Singh et al. |
| 2021/0273899 A1* | 9/2021 | Bastide ................. H04L 51/216 |
| 2021/0334473 A1* | 10/2021 | Trehan .................... H04L 51/04 |

OTHER PUBLICATIONS

Wikipedia, "Automated machine learning", last edited Jan. 25, 2021, 1 page; https://en.wikipedia.org/wiki/Automated_machine_learning.

Saama, "Deep Learning and Context Based Intelligent Search", retrieved from Internet Jan. 27, 2021, 2 pages; https://www.saama.com/deep-learning-context-based-intelligent-search/.

Diana Borsa et al., "Observational Learning by Reinforcement Learning", arXiv:1706.06617v1 [cs.LG], Jun. 20, 2017, 10 pages.

Mateusz Zarkowski, "Multi-party Turn-Taking in Repeated Human-Robot Interactions: An Interdisciplinary Evaluation", International Journal of Social Robotics, Nov. 8, 2019, 15 pages.

Facebook, "Building Bots", retrieved from Internet Sep. 28, 2020, 12 pages. https://developers.facebook.com/docs/workplace/integrations/custom-integrations/bots/#bottogroupchat.

* cited by examiner

FIG. 4

Streams Schema 400

| StreamID 405 | ConversationID 410 | WhoTo 415 | WhoFrom 420 | Message 425 | Acknowledge 430 | AcknowledgeBy 435 | CreatedOn 440 |
|---|---|---|---|---|---|---|---|
| UniqueID for this stream | Pointer to Conversation to which this stream belongs | Who the stream is intended for | Who the stream is from | Data stream | Acknowledgment of receipt | By whom (can be multiple) in the conversation acknowledged | When the stream was sent |

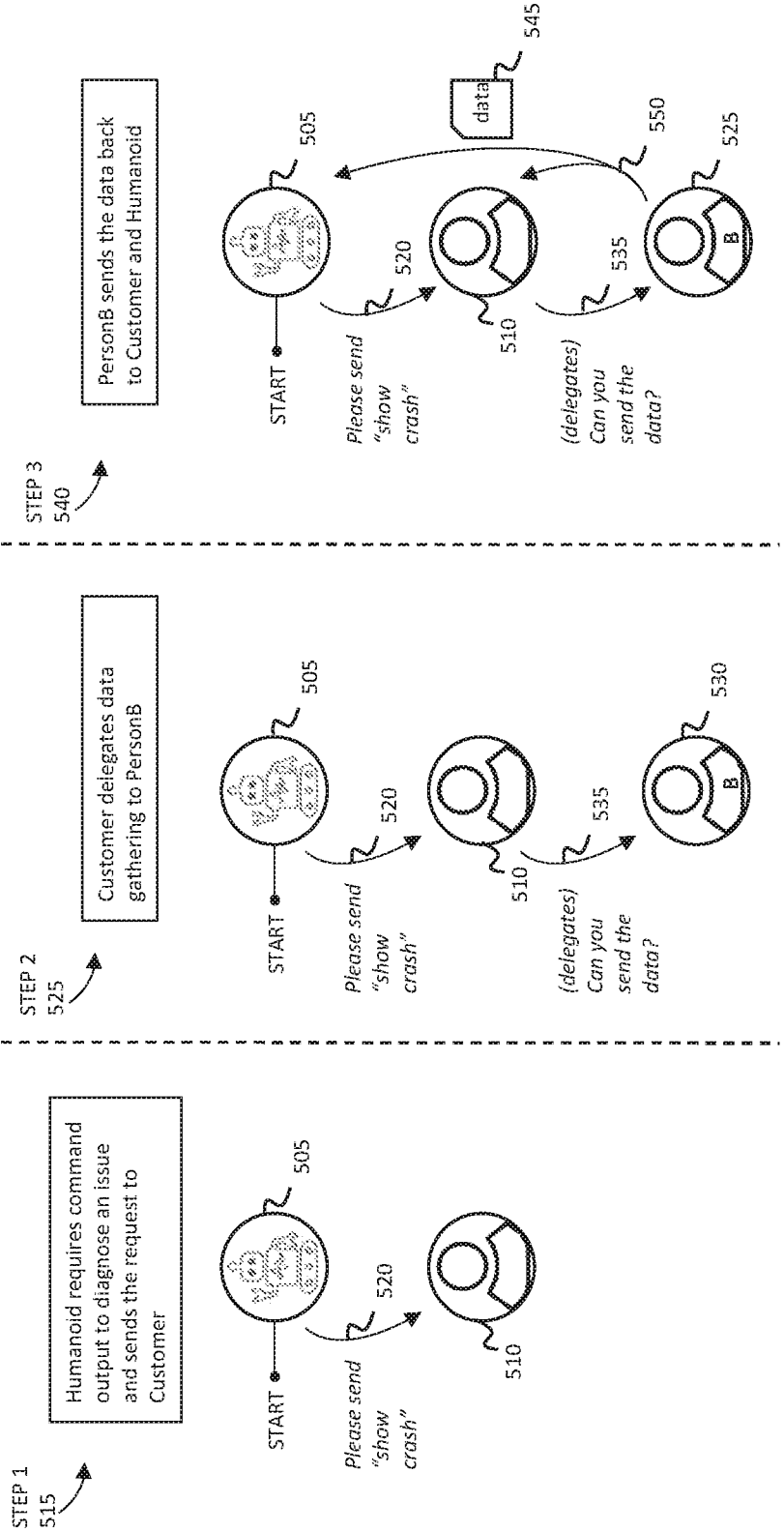

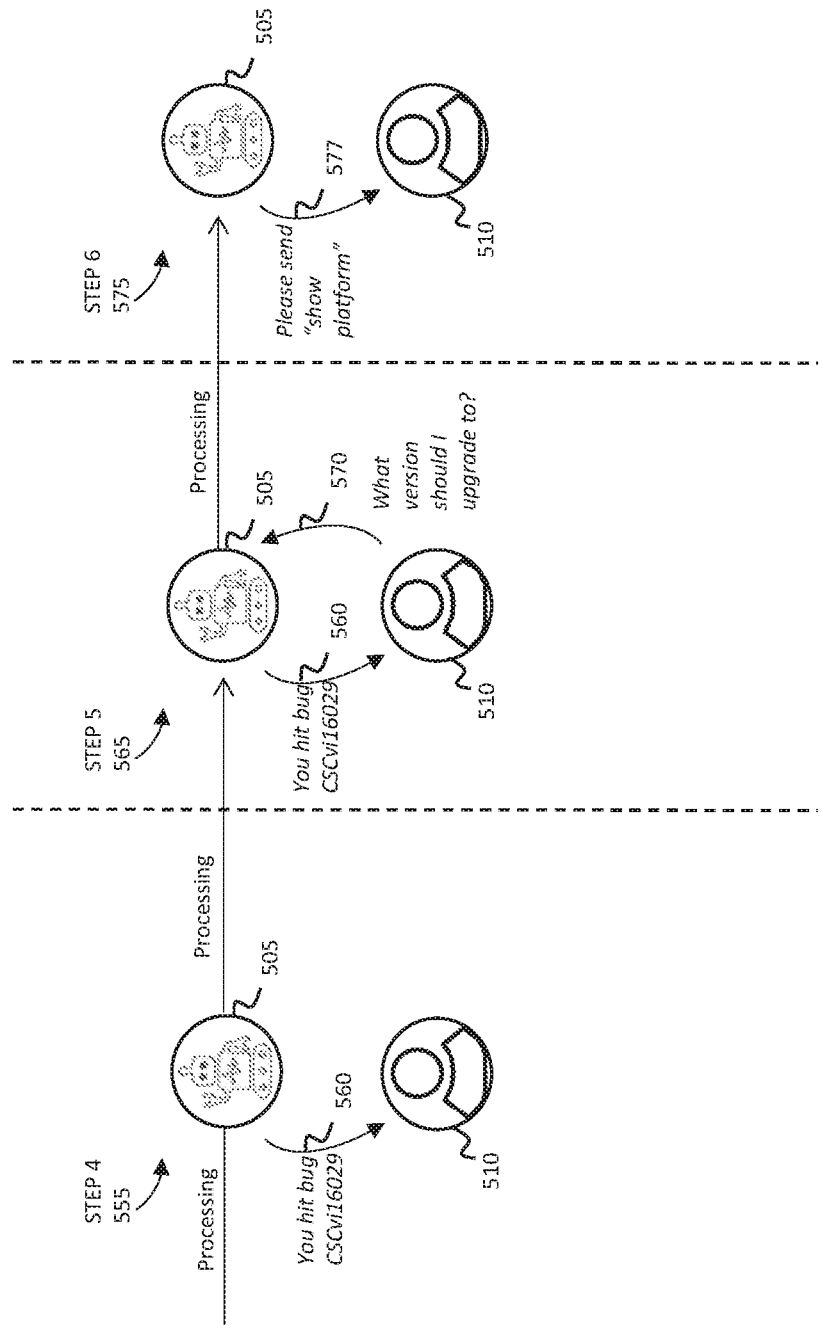

MODELING COMMUNICATION DATA STREAMS FOR MULTI-PARTY CONVERSATIONS INVOLVING A HUMANOID

CROSS REFERENCE TO RELATED APPLICATION

This application claims priority to U.S. Provisional Patent Application No. 63/051,560, titled "Tracking Communication as Data Streams," filed Jul. 14, 2020, the entirety of which is incorporated herein by reference.

TECHNICAL FIELD

The present disclosure relates to modeling communication data streams for multi-party conversations involving a humanoid.

BACKGROUND

It is increasingly expected for machines, such as humanoids, to perform tasks historically performed by humans. In certain contexts, it is desirable for the actions of a machine to be virtually indistinguishable from those of a human. For example, in a customer support context, it may be desirable for a humanoid to provide support in a manner such that a customer receiving the support believes they are communicating directly with a human rather than a machine.

For machines to communicate effectively with humans, the machines need to be configured to understand and respond timely and effectively to human language. In particular, machines need to be configured to understand, in a conversation involving multiple other parties, when and how to engage or interject. Unlike humans, machines do not have natural senses or other means for inferring when and how they are expected to participate in such a conversation.

BRIEF DESCRIPTION OF THE DRAWINGS

FIG. 4 illustrates a schema for modeling communications in multi-party conversations involving a humanoid, according to an example embodiment.

FIGS. 5A-5C are diagrams depicting creation, progress, and modeling of a multi-party conversation involving a humanoid, according to an example embodiment.

DESCRIPTION OF EXAMPLE EMBODIMENTS

Overview

A computer executed process for mimicking human dialog, referred to herein as a "humanoid" or "humanoid process software," can be configured to participate in multi-party conversations. The humanoid can monitor electronic communications in a conversation involving the humanoid and at least one other party. For example, each other party can be a person, machine, or computer executed process (e.g., a humanoid). The humanoid can model the electronic communications by uniquely identifying each of the electronic communications as a stream of data. For example, the data can be labeled and sorted in a database and/or arranged in a nodal graph representation. The humanoid can participate in the conversation based on the modeling.

Example Embodiments

Presented herein are systems and methods for modeling communication data streams for multi-party conversations involving a humanoid. The humanoid can model electronic communications in conversations by uniquely identifying each of the electronic communications as a stream of data. The humanoid can label, sort, and interpret data for each data stream in a defined database schema, nodal graph, or other structure to enable the electronic communications to be tracked, interpreted, and differentiated. For example, the humanoid can determine, based on the modeling, when and how the humanoid is expected to participate in the conversation. Thus, the humanoid can timely and effectively interact in the conversation, interjecting when appropriate. For example, the humanoid can participate in the conversation as a human would, using the modeling to interpret a context and subtle indications of who should respond, even when no participant is singled out to respond. The modeling also may include representing the data visually, e.g., as a nodal graph, thereby allowing a person observing or participating in the conversation to see where the humanoid is in the conversation and what the next steps may be.

Merely for ease of description, the techniques presented herein are primarily described with reference to a specific type of conversation, namely a customer support conversation. However, it is to be appreciated that the techniques presented herein may be implemented in any type of conversation where electronic communications involve a humanoid and one or more other parties. The electronic communications can include emails, instant messages, text messages, posts on webpages (e.g., in a discussion forum), chats, voice communications (e.g., involving speech, speech-to-text transcription, and/or text-to-speech transcription), and/or any other types of communications, now known or hereinafter developed, exchanged via an electronic medium.

Figure 1:
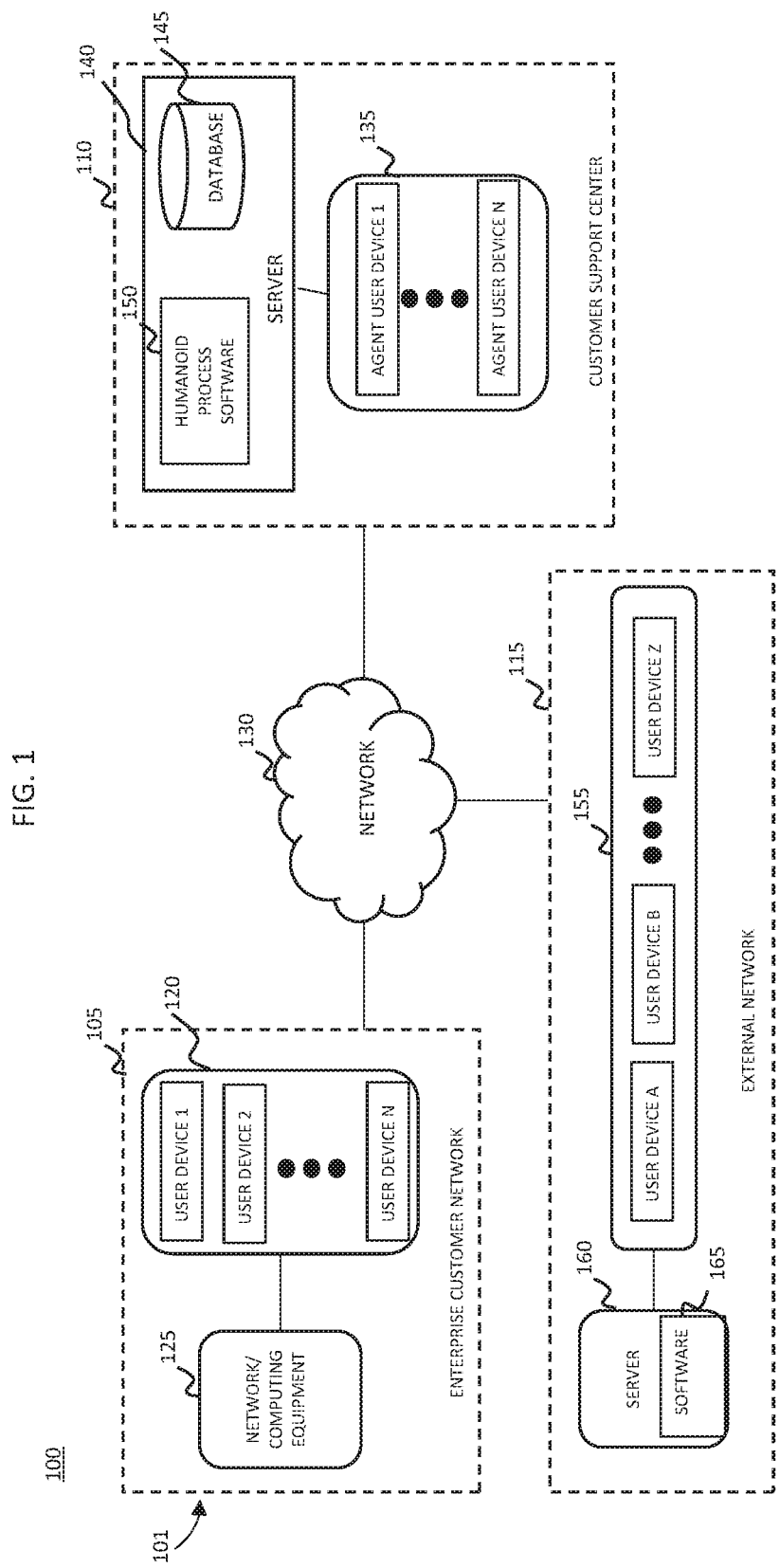
FIG. 1 is a diagram of a system for modeling communication data streams for multi-party conversations involving a humanoid, according to an example embodiment.

Referring initially to FIG. 1, an example system 100 for modeling communication data streams for multi-party conversations involving a humanoid can include an enterprise customer network 105 of a customer 101, a customer support center 110, and an external network 115. The customer 101 is a company or other entity/enterprise that receives support services from the customer support center 110. The enterprise customer network 105 includes multiple user devices 120, which are configured to operate within the enterprise customer network 105. Each user device 120 includes a computer or processing system, such as a desktop, laptop, tablet, phone, or other mobile or non-mobile device. Each user device 120 may include, for example, one or more types of displays (e.g., a screen or monitor) and input devices (e.g., a keyboard, mouse, voice recognition, etc.) to enter and/or view information.

The user devices 120 may be configured to communicate with one another and/or one or more other computing devices, e.g., via network/computing equipment 125. The network/computing equipment 125 can include one or more software and/or hardware modules or units, processing or computer systems, and/or circuitry that provides interfaces, connections (wired or wireless), or other pathways for electronic communication. For example, the network/computing equipment 125 can include one or more copper transmission cables, optical transmission fibers, wireless transmission devices, routers, firewalls, switches, gateway computers, and/or edge servers.

The user devices 120 may be configured to communicate with various systems and devices external to the enterprise customer network 105, such as systems and devices of the customer support center 110 and external network 115, via a network 130. The network 130 includes any communications medium for transmitting information between two or more computing devices. For example, the network 130 can include a LAN, WAN, VPN, Intranet, Internet, hardwire connections, modem connections, wireless connections, or combinations of one or more these items.

The customer support center 110 includes multiple agent user devices 135, which are configured to operate within the customer support center 110. The agent user devices 135 can cooperate with a server 140 and/or other network/computing equipment (not shown) to provide technical or other support services to customers, including the customer 101. For example, the agent user devices 135 and server 140 can provide technical support to the customer 101 in connection with the network/computing equipment 125. Each agent user device 135 includes a computer or processing system, such as a desktop, laptop, tablet, phone, or other mobile or non-mobile device. Each agent user device 135 may include, for example, one or more types of displays (e.g., a screen or monitor) and input devices (e.g., a keyboard, mouse, voice recognition, etc.) to enter and/or view information.

The server 140 is a computing device that includes a database 145 and humanoid process software 150. The database 145 includes data stores or storage structures (e.g., files, databases, data structures, data or other repositories, etc.) that are configured to store information. For example, as described in more detail below, the database 145 can be configured to store communication information in accordance with one or more defined schemas. Though depicted in FIG. 1 as being located within the customer support center 110, it should be recognized that the database 145 could be located remote from the customer support center 110, e.g., in a cloud or data center solution, in alternative example embodiments.

The humanoid process software 150 includes software, which when executed by a computer processor, such as a processor of the server 140, can mimic human dialog. For example, as described in more detail below, the humanoid process software 150 can be configured to participate in conversations involving the humanoid process software 150 and one or more user devices 120 and/or agent user devices 135 to provide customer support services to the customer 101.

The external network 115 includes multiple user devices 155, which are configured to operate within the external network 115. For example, the user devices 155 can cooperate with a server 160 and/or other network/computing equipment within or outside of the external network 115 to perform auxiliary services in connection with the customer support services of the customer support center 110. Each user device 155 includes a computer or processing system, such as a desktop, laptop, tablet, phone, or other mobile or non-mobile device. Each user device 155 may include, for example, one or more types of displays (e.g., a screen or monitor) and input devices (e.g., a keyboard, mouse, voice recognition, etc.) to enter and/or view information.

The server 160 is a computing device that includes software 165, which when executed by a computer processor, such as a processor of the server 160, can aid in the provision of the auxiliary support services. For example, the user devices 155 and software 165 can cooperate to solve problems or otherwise take action to address a customer support issue being handled by the customer support center 110.

Figure 2:
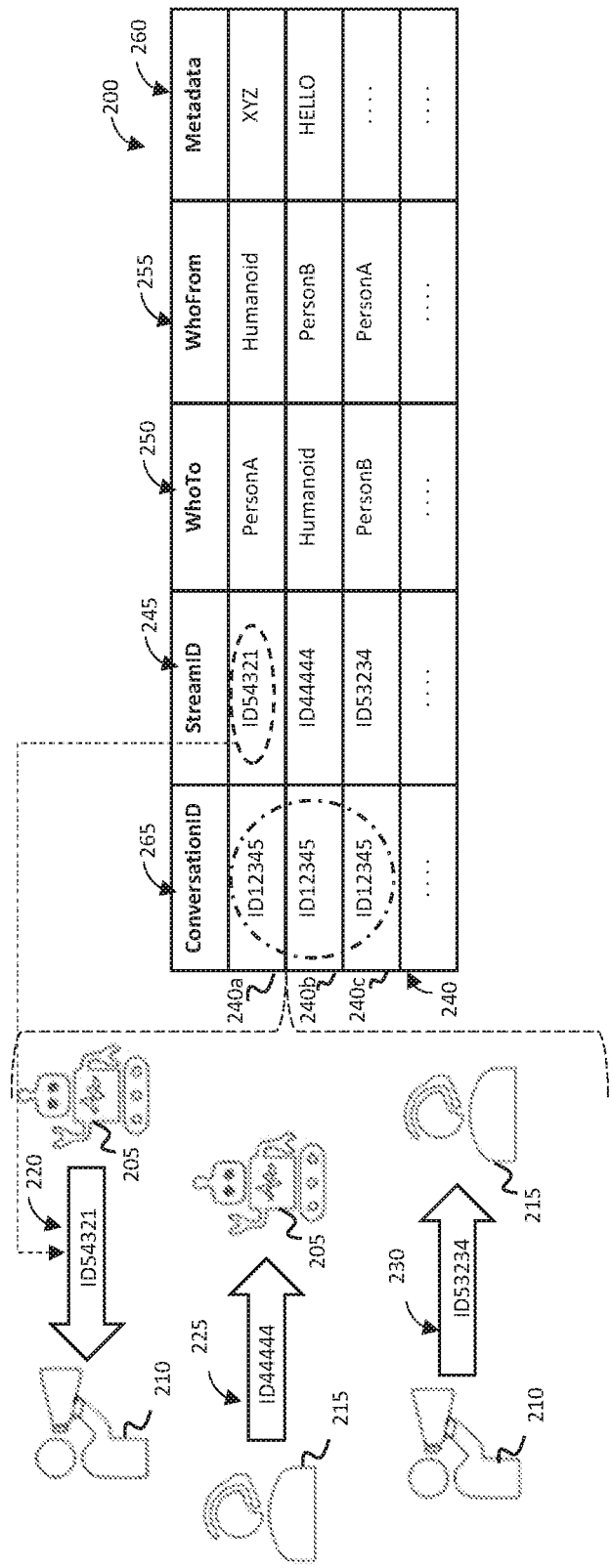
FIG. 2 illustrates a table for modeling communication data streams in a multi-party conversation involving a humanoid, according to an example embodiment.

According to example embodiments presented herein, the humanoid process software 150 is configured to participate in conversations between multiple endpoints, such as the user devices 120, agent user devices 135, humanoid process software 150, and user devices 155, by modeling electronic communications in the conversations as data streams. FIG. 2 illustrates a table 200 that can be created and/or used to model communication data streams in multi-party conversations, according to an example embodiment. For example, the table 200 can be used to track conversations including electronic communications involving a humanoid 205 ("Humanoid"), a first person ("PersonA") 210, and a second person ("PersonB") 215. PersonA 210 and PersonB 215 can participate in the conversations, e.g., via one or more computing devices.

In an example conversation depicted in FIG. 2, Humanoid 205 sends a first electronic communication 220 to PersonA 210, then PersonB 215 sends a second electronic communication 225 to Humanoid 205, and then PersonA 210 sends a third electronic communication 230 to PersonB 215. Each of the electronic communications 220, 225, and 230 is a uni-directional "stream" of data in which one of the endpoints (i.e., Humanoid 205, PersonA 210, or PersonB 215) is the sender of the electronic communication, and another of the endpoints is the receiver of the electronic communication. Humanoid 205 translates each of these streams into the table 200 as a segment 240 (or "row") of data with a unique stream identifier ("StreamID") (in a StreamID field) 245 and associated data and metadata. In particular, for each electronic communication stream, Humanoid 205 assigns and stores a unique StreamID, as well as an identifier for the communication recipient ("WhoTo"), an identifier for the communication sender ("WhoFrom"), and any metadata associated with the communication. Humanoid 205 also assigns a ConversationID to each segment 240 as described below. As would be recognized by a person of skill in the art, additional types of data may be stored in the segments 240 in alternative embodiments.

With reference to the specific example depicted in FIG. 2, upon occurrence of the first electronic communication 220, Humanoid 205 can initiate creation of the table 200 by populating a first segment 240a corresponding to the first electronic communication 220. In particular, Humanoid 205 can create the first segment 240a by assigning to the conversation (and populating in a ConversationID field 265 of the first segment 240a) ConversationID "ID12345," assigning to the first electronic communication 220 (and populating in the StreamID field 245 of the first segment 240a) StreamID "ID54321," populating a WhoTo field 250 of the first segment 240a with "PersonA", populating a WhoFrom field 255 of the first segment 240a with "Humanoid," and populating a Metadata 260 field of the first segment 240a with "XYZ" or another appropriate set of characters that is descriptive of the nature of the first electronic communication 220.

In an example embodiment, Humanoid 205 is always "listening" for new communications, and at some point a new or "unheard" communication is observed by the Humanoid 205 and determined by Humanoid 205 to be a first communication in a new or as-yet unheard conversation. Humanoid 205 can register the conversation in the table 200 by creating and recording unique ConversationID and StreamID values for the conversation and communication, respectively.

Humanoid 205 can continue to model the conversation by adding segments 240 to the table 200. For example, upon receiving the second electronic communication 225, Humanoid 205 can add to the table 200 a second segment 240b corresponding to the second electronic communication 225. In particular, Humanoid 205 can create the second segment 240b by assigning to the second electronic communication 225 (and populating in the StreamID field 245 of the second segment 240b) StreamID "ID44444," associating the second electronic communication 225 to the same conversation as the first electronic communication 220 by populating the ConversationID field 265 of the second segment 240b with ConversationID "ID12345," populating the WhoTo field 250 of the second segment 240b with "Humanoid," populating the WhoFrom field 255 of the second segment 240b with "PersonB," and populating the Metadata 260 field of the second segment 240b with "HELLO."

The third electronic communication 230 is not directed to Humanoid 205 or sent from Humanoid 205. However, Humanoid 205 is configured to observe (e.g., by "eavesdropping" on) the third electronic communication 230 and add the third electronic communication 230 to the table 200 in a third segment 240c. Humanoid 205 can determine, e.g., based on information in or associated with the third electronic communication 230, whether the third electronic communication 230 belongs to the same conversation as the conversation that includes the first electronic communication 220 and the second electronic communication 225. For example, Humanoid 205 can consider factors, such as identities of the communication participants, any subject line or header for the communication, content within the electronic communication, a time of the communication, etc., to determine whether a particular electronic communication belongs to a conversation.

In the example depicted in FIG. 2, the Humanoid 205 has determined that the third electronic communication 230 belongs to the same conversation as the conversation that includes the first electronic communication 220 and second electronic communication 225 and, therefore, has populated the third segment 240c with a StreamID "ID53234," which is associated with the same ConversationID ("ID12345") as the ConversationIDs of the first segment 240a and second segment 240b. If Humanoid 205 had determined that the third electronic communication 230 did not belong to the same conversation as the conversation that includes the first electronic communication 220 and second electronic communication 225, Humanoid 205 could have populated the ConversationID for the third segment 240c with a different ConversationID, which is newly created and/or newly assigned for the third electronic communication 230.

Humanoid 205 can continue to add to the table 200 until all communication streams have ceased. Thus, the table 200 may include a real-time or near real-time representation of all communication streams from one or more different conversations. In an example embodiment, upon receipt of a confirmation of closure of the conversation, or if no additional communications requiring action are received within a predetermined period of time, Humanoid 205 can terminate the conversation. For example, Humanoid 205 can terminate the conversation by ceasing to actively "listen" for further communications in the conversation (and ceasing to model any such communications in the table 200).

As would be recognized by a person of ordinary skill in the art, the table 200, including the row and column structure of the table 200, is illustrative and should not be construed as being limiting in any way. Many suitable variations for the table 200 would be apparent to a person of ordinary skill in the art. In particular, additional, less, or different fields may be included, and the information may be organized in a different format, in alternative example embodiments.

Figure 3:
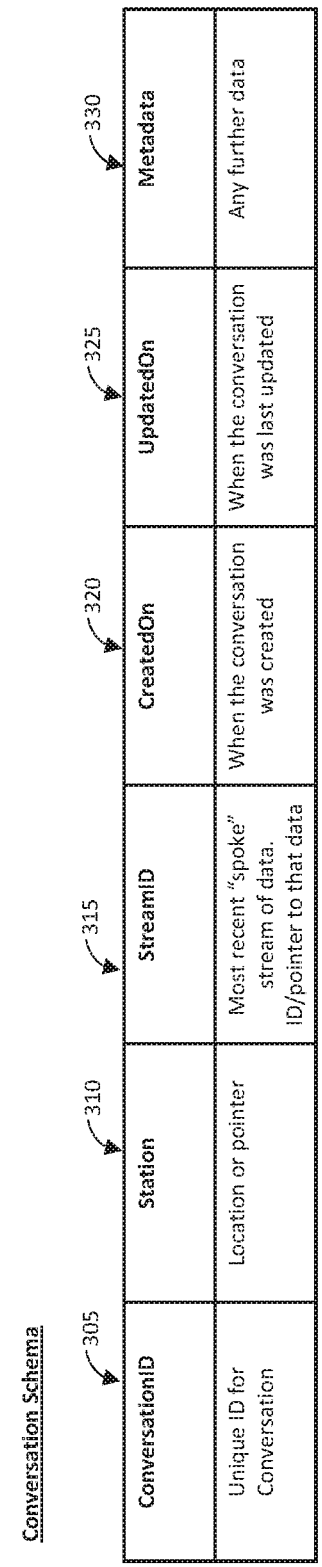
FIG. 3 illustrates a schema for modeling multi-party conversations involving a humanoid, according to an example embodiment.

FIG. 3 illustrates a schema 300 for modeling multi-party conversations involving a humanoid, according to an example embodiment. For example, the schema 300 can be used in a database or other computer system to create a table, nodal-graph, or other structure for modeling the multi-party conversations. The schema 300 includes a ConversationID field 305, a Station field 310, a StreamID field 315, a CreatedOn field 320, an UpdatedOn field 325, and a Metadata field 330. Similar to the table 200 described above in connection with FIG. 2, the ConversationID field 305 includes an identifier that uniquely identifies a conversation. For example, the unique identifier can include one or more numbers, letters, characters, images, or other items, which uniquely identify a corresponding conversation. Each conversation modeled via the schema 300 is represented via a unique ConversationID in the ConversationID field 305.

The Station field 310 includes a location or pointer to a location or endpoint to which a humanoid or other computer process associated with the conversation should be listening for the next communication stream in the conversation. For example, the Station field 310 could identify the humanoid, indicating to the humanoid that it is responsible for, and should begin, taking a next action. Alternatively, the Station field 310 could identify a conversation participant other than the humanoid, indicating to the humanoid that it does not need to take a next action but nevertheless should "listen" for another communication. For example, the humanoid can monitor (or "eavesdrop" on) the conversation stream in case a next communication in the conversation calls for a response by the humanoid. As described in more detail below, the humanoid can respond or act on any communication stream at any time, e.g., using its own knowledge or by learning information from the conversation.

In certain example embodiments, the humanoid can update the Station field 310 in real-time (or near real-time) based on new information from the communications or other factors. For example, if a next communication in the conversation is not sent timely or if a next communication includes a question for which the humanoid has an answer, the humanoid can change the Station field 310 from a non-humanoid participant in the conversation to the humanoid to reflect that the humanoid is responsible for soliciting a communication or providing an answer.

The StreamID field 315 identifies a most recent communication stream in the conversation. For example, the humanoid can use the StreamID field 315 to "look back" at the last stream and refer to it in a next communication from the humanoid to a sender of the last stream, thereby providing appropriate context in that next communication.

The CreatedOn field 320 includes a date and/or time indicating when the conversation was created. The UpdatedOn field 325 includes a date and/or time indicating when the conversation was last updated. For example, a humanoid and/or a person observing or participating in the conversation can use the CreatedOn field 320 and the UpdatedOn field 325 to track conversation progress.

The Metadata field 330 can include any additional data related to, and/or descriptive of, the conversation. For example, the metadata can include implementation details, like a case number, name of the humanoid, contact information (email, instant message, webpage, chat room addresses, etc.) for the conversation participants, etc. The Metadata field 330 can either be implemented in a singular format (like JavaScript Object Notation (JSON) or Extensible Markup Language (XML)) or in a series of additional columns or rows.

As would be recognized by a person of ordinary skill in the art, the schema 300, including the row and column structure presented in FIG. 3, is illustrative and should not be construed as being limiting in any way. Many suitable variations for the schema 300 would be apparent to a person of ordinary skill in the art. In particular, additional, less, or different fields may be included, and the information may be organized in a different format, in alternative example embodiments.

FIG. 4 illustrates a schema 400 for modeling communications in multi-party conversations involving a humanoid, according to an example embodiment. For example, the schema 400 can be used in a database or other computer system to create a table, nodal-graph, or other structure for modeling the multi-party conversations. The schema 400 includes a StreamID field 405, a ConversationID field 410, a WhoTo field 415, a WhoFrom field 420, a Message field 425, an Acknowledge field 430, an AcknowledgeBy field 435, and a CreatedOn field 440.

The StreamID field 405 includes an identifier that uniquely identifies a communication by uniquely identifying a data segment or ("stream") corresponding to the communication. For example, the unique identifier can include one or more numbers, letters, characters, images, or other items, which uniquely identify a corresponding communication (or stream). Each communication modeled via the schema 400 is represented via a unique StreamID in the StreamID field 405.

The ConversationID field 410 identifies and/or includes a pointer to the conversation to which the communication belongs. For example, the ConversationID field 410 can include a ConversationID assigned to a conversation via the schema 300 described above in connection with FIG. 3. In an example embodiment, each communication is associated with one conversation, while each conversation can be associated with multiple different communications. For example, a particular conversation may be modeled via one "row" in a conversation schema (such as schema 300), which includes conversation information, and multiple "rows" in a communication schema (such as schema 400), which link to the conversation schema.

The WhoTo field 415 identifies a recipient of a particular communication, while the WhoFrom field 420 identifies a sender of the communication. The Message field 425 includes a content of the communication, such as a payload of a message. The Acknowledge field 430 includes an acknowledgment of receipt, and the AcknowledgeBy field 435 identifies from whom the conversation has been acknowledged.

Multiple participants in the communication can be identified in the AcknowledgeBy field 435. The Acknowledge field 430 and AcknowledgeBy field 435 enable verification of communication receipt. For example, communications that are not fully transmitted from a source to a destination may be retransmitted. In an example embodiment, acknowledgments can include unique identifiers and/or pointers to other communications that acknowledge back the original communication. The CreatedOn field 440 includes a date and/or time when the communication was sent. For example, this information may be used to track, report on, and/or take action related to, progress of the conversation.

As would be recognized by a person of ordinary skill in the art, the schema 400, including the row and column structure presented in FIG. 4, is illustrative and should not be construed as being limiting in any way. Many suitable variations for the schema 400 would be apparent to a person of ordinary skill in the art. In particular, additional, less, or different fields may be included, and the information may be organized in a different format, in alternative example embodiments.

Figure 5C:
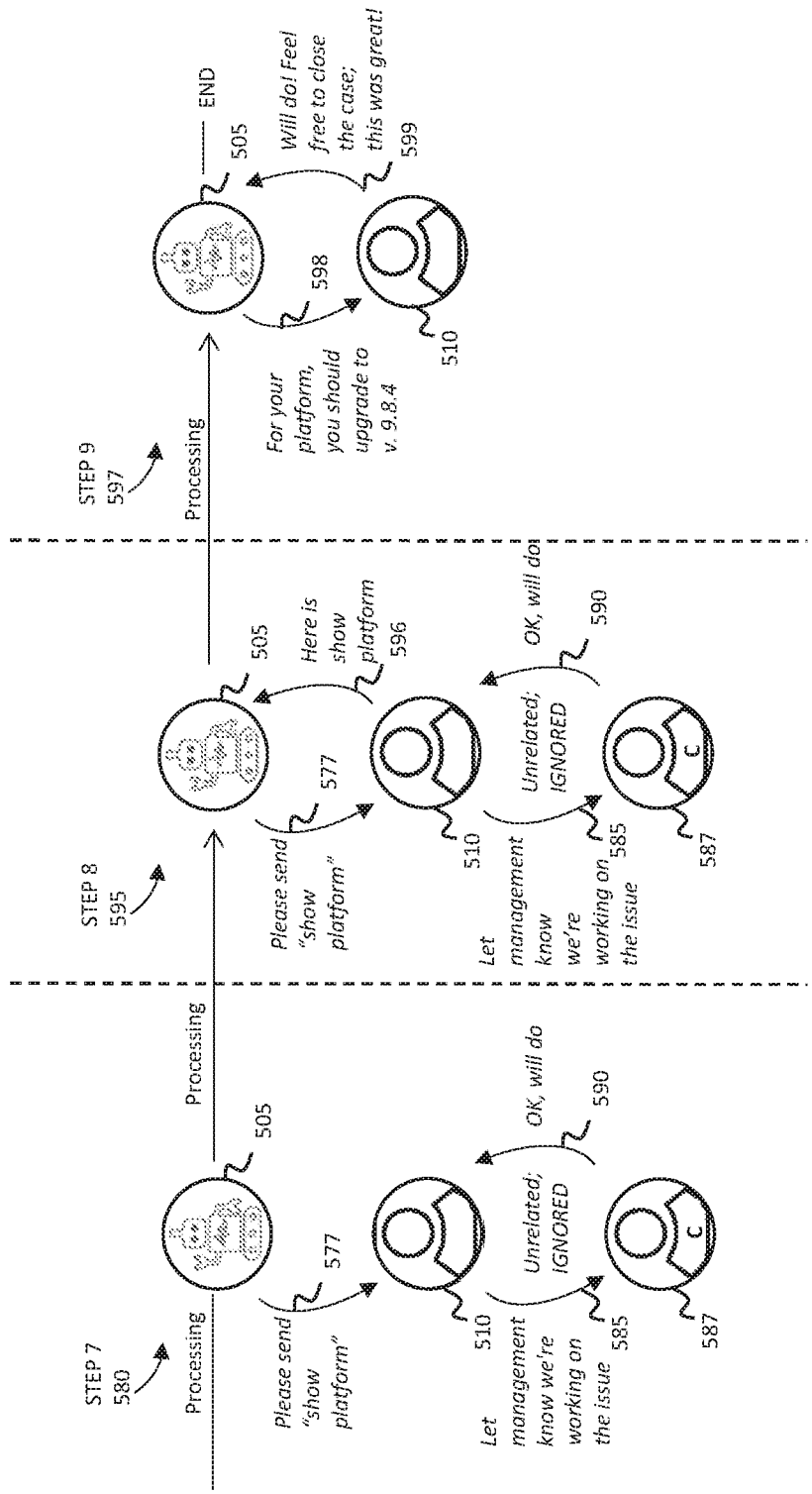

Reference is now made to FIGS. 5A-5C, which illustrate creation, progression, and modeling of a multi-party conversation involving a humanoid, according to an example embodiment. The conversation includes a series of electronic communications, which can each take the form of an email, instant message, text message, webpage post (e.g., in a discussion forum), chat, voice communications (e.g., involving speech, speech-to-text transcription, and/or text-to-speech transcription), or other type of communication exchanged via an electronic medium. The conversation involves a humanoid 505 and a customer 510. The humanoid 505 is providing customer service support to the customer 510. In particular, the customer 510 has experienced a computer malfunction (or "crash"), and the humanoid 505 is communicating with the customer 510 to try and resolve the crash.

The conversation is modeled and represented visually in FIGS. 5A-5C as a nodal graph, where each edge represents a communication stream and each node represents an endpoint. In an example embodiment, the conversation also may be modeled via a database table, in accordance with the techniques described above. Within the nodal graph, each node represents a participant in the conversation, and each edge represents a communication involving two or more of the conversation participants. Respective "rows" or "levels" of the nodal graph can correspond to each node/endpoint. Each node can have one or more edges emanating from it, representing one or more communications from the node to one or more other nodes. Each node also may have one or more edges terminating on it, representing inbound streams to the node.

The humanoid 505 can monitor and model the communications in the conversation by dynamically constructing the nodal graph. Alternatively, the humanoid 505 can monitor and model the communications in the conversation by dynamically constructing a data table from which another software process may construct the nodal graph. In an example embodiment, the humanoid 505 can cause the nodal graph to be displayed to a person observing or participating in the conversation (e.g., via a display on a computing device) so that the person can see information regarding the conversation, including, e.g., a current status. The nodal graph may include colors, icons, or other features to provide additional context regarding the conversation. For example, a node for the humanoid 505 may be color coded to indicate whether the humanoid 505 is awaiting information to proceed with a next action. Similarly edges within the nodal graph may be color coded to indicate whether corresponding communications include a statement, question, or answer.

In a first step 515 of the conversation, the humanoid 505 sends the customer 510 an electronic communication 520, asking the customer 510 to provide information regarding the customer support needed by the customer 510. In particular, the electronic communication 520 requests that the customer 510 provide information regarding the crash, saying, "Please send 'show crash.'" In a second step 525, the customer sends a communication 535 to another person ("PersonB") 530 to obtain the requested information. For example, the communication 535 could include a message saying, "Can you send the data?", directed to PersonB 530 with a copy to (or otherwise including) the humanoid 505.

In a third step 540, PersonB 530 responds to the request by sending the customer 510 and humanoid 505 the requested data 545 in a communication 550. In a fourth step 555 (FIG. 5B), the humanoid 505 processes the data received in the communication 550 and sends the customer 510 a communication 560 with its analysis of the data. More specifically, the humanoid 505 tells the customer 510 in the communication 560 that they have encountered a known computer bug called "CSVi16029".

Next, in a fifth step 565, the customer 510 confirms receipt of the communication 560 and asks, in a communication 570, a new question regarding a version of software to which they should upgrade. The humanoid 505 processes this new question and, in a sixth step 575 sends the customer 510 a communication 577 with a request for additional information regarding the customer's user platform. In a seventh step 580 (FIG. 5C), the customer 510 sends a communication 585 to a new person ("PersonC") 587, saying, "Let management know we're working on the issue," and PersonC 587 responds to the communication 585 with a communication 590, saying, "OK, will do." The humanoid 505 can read the communications 585 and 590 and determine to ignore and not respond to them, whether by taking action, sending a communication, or otherwise. For example, the humanoid 505 can determine not to respond to the communications 585 and 590 because the communications 585 and 590 are not directed to the humanoid 505, do not pose any questions the humanoid 505 can answer, and do not include any information requested by the humanoid 505 or otherwise resolving any open issues being addressed by the humanoid 505.

In an eighth step 595, the customer 510 responds to the humanoid 505 with the requested platform information in communication 596. In a ninth step 597, the humanoid 505 processes the platform information from the communication 596 and sends the customer 510 an answer to the open inquiry (from communication 570) regarding the software version to upgrade to, in a communication 598, saying, "For your platform, you should upgrade to v. 9.8.4." The customer 510 can send a communication 599 to acknowledge closure of the issue, e.g., by saying, "Will do! Feel free to close the case; this was great!" Upon receipt of a confirmation of closure or if no additional communications requiring action by the humanoid 505 are received within a predetermined period of time, the humanoid 505 can close the matter and terminate the conversation. For example, the humanoid 505 can terminate the conversation by ceasing to actively "listen" for further communications in the conversation.

Noteworthy about the communications depicted in the example of FIGS. 5A-5C is that the humanoid 505 very closely mimics the behavior of a human such that the humans involved in the communications do not realize they are dealing with a machine-based process that is simulating a human.

Figure 6:
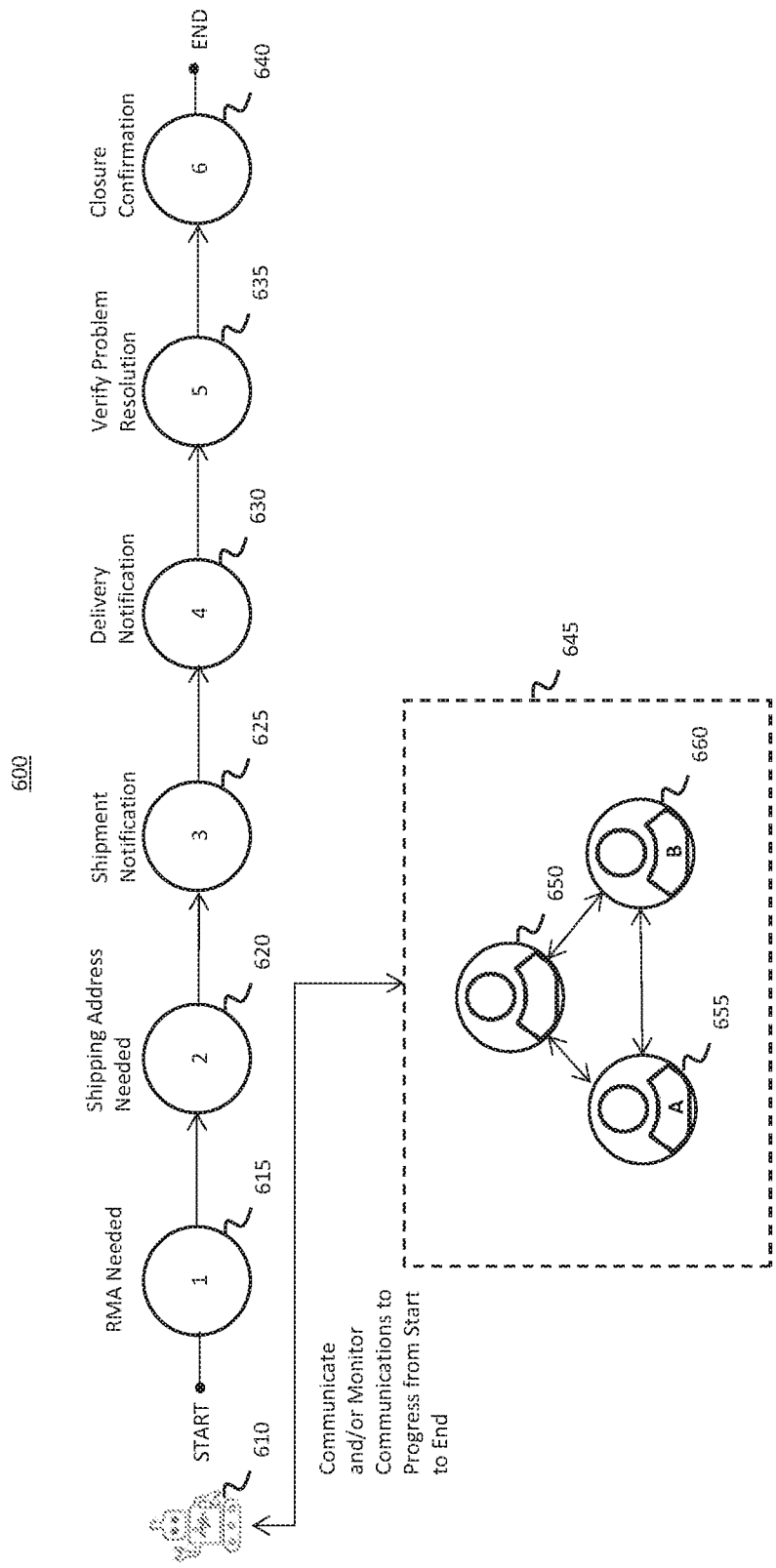
FIG. 6 is a diagram depicting an operational flow for providing customer support by modeling communication data streams in a multi-party conversation involving a humanoid, according to an example embodiment.

Turning now to FIG. 6, an example operational flow 600 is shown for providing customer support by modeling communication data streams in a multi-party conversation involving a humanoid, according to an example embodiment. The operational flow 600 of FIG. 6 involves a return merchandise authorization (RMA) customer support process by which items can be returned for repair, maintenance, refund, or replacement. As would be recognized by a person of ordinary skill in the art, this type of customer support process is illustrative and should not be construed as being limiting in any way. In particular, the techniques disclosed herein can be used in connection with other customer service and non-customer service related communications without departing from the spirit or scope of this disclosure.

The operational flow 600 is implemented via a humanoid 610, which is configured to provide the customer support by modeling communication data streams in a conversation involving the humanoid 610 and one or more other endpoints 645. For example, the endpoints 645 can include a customer 650, a first person ("PersonA") 655, and a second person ("PersonB") 660. The customer 650, PersonA 655, and PersonB 660 can participate in the conversation, e.g., via one or more computing devices.

The humanoid 610 models the conversation (e.g., via a data table and/or nodal graph), collecting information via the communications in the conversation in order to progress through the operational flow 600. For example, after determining in a first step 615 that RMA is needed, the humanoid 610 can determine in a second step 620 that it needs a shipping address. The humanoid 610 can ask one or more of the endpoints 645 for the shipping address information and/or monitor communications involving the endpoints 645 to accept (and, optionally, acknowledge) receipt of that information.

In an example embodiment, the humanoid 610 can obtain the information from the communications, regardless of whether the humanoid 610 was the directed recipient of the information. For example, in response to the request from the humanoid 610 or unrelated to the request from the humanoid 610, the customer 650 may send a communication to PersonA 655 (e.g., with a copy to, or otherwise including, the humanoid 610) with the required shipping information. The humanoid 610 may accept and acknowledge the shipping information even though the communication was not directed to the humanoid 610 (e.g., if the humanoid 610 is not identified in the "to:" field of the communication) and even if the communication does not specifically call out the humanoid 610 in a salutation or body of the communication. Upon accepting the shipping information, the humanoid 610 may proceed to prepare a shipment notification in step 625, prepare a delivery notification in step 630, verify problem resolution 635, and confirm closure of the customer support case in step 640.

Figure 7:
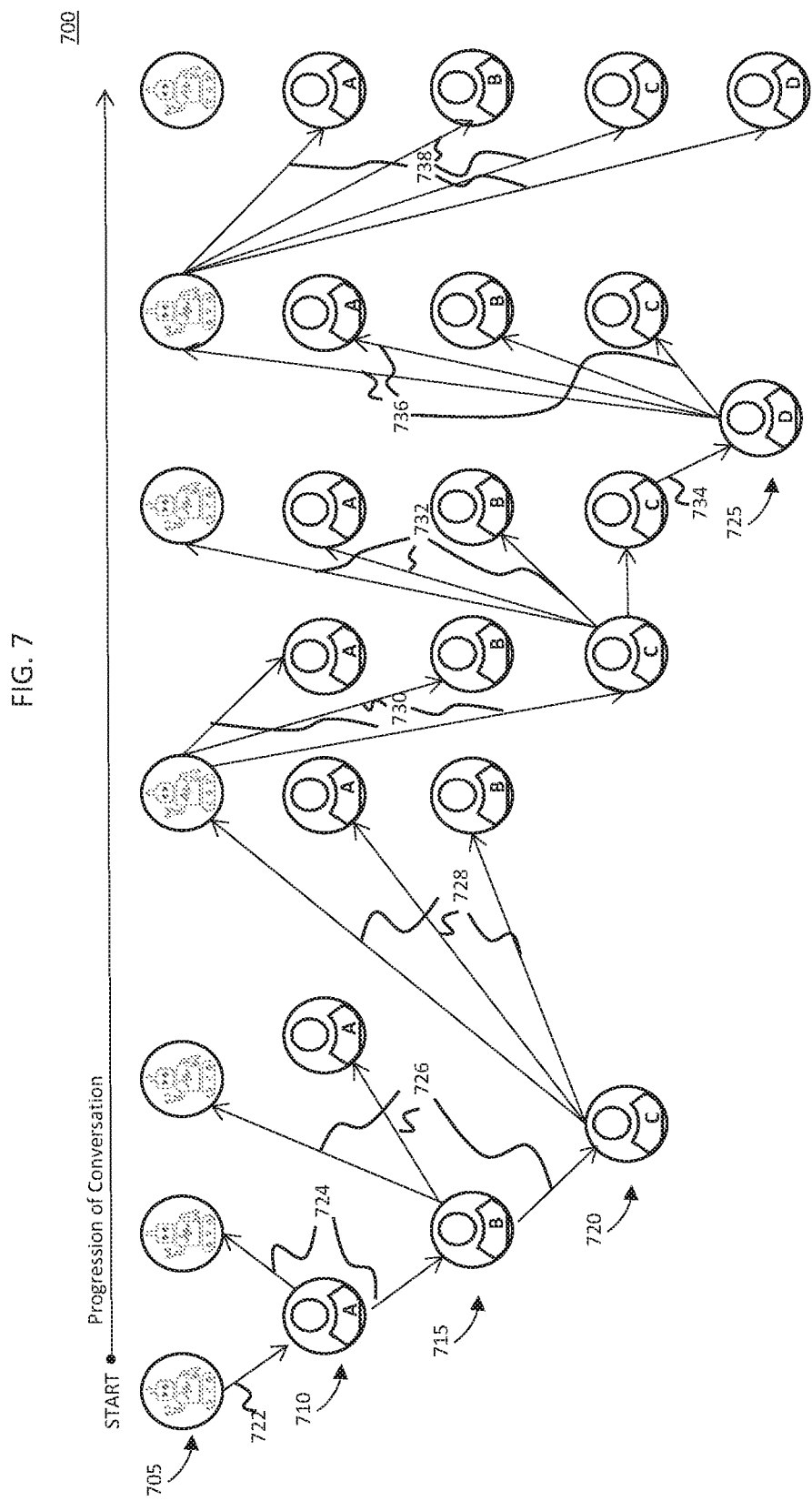
FIG. 7 is a nodal graph for modeling communication data streams in a multi-party conversation involving a humanoid, according to an example embodiment.

Turning now to FIG. 7, a nodal graph 700 can be used in connection with the systems and methods described herein to model communication data streams for multi-party conversations involving a humanoid, according to an example embodiment. The nodal graph 700 includes a visual representation of a conversation involving a humanoid 705, a first person ("PersonA") 710, a second person ("PersonB") 715, a third person ("PersonC") 720, and a fourth person ("PersonD") 725. For example, PersonA 710, PersonB 715, PersonC 720, and PersonD 725 can participate in the conversation via one or more computing devices. Respective "rows" or "levels" of the nodal graph 700 can correspond to each node/endpoint.

Each edge of the nodal graph 700 represents a communication stream, and each node represents an endpoint. In particular, each node represents a participant in the conversation (i.e., the humanoid 705, PersonA 710, PersonB 715, PersonC 720, or PersonD 725), and each edge represents a communication involving two or more of the conversation participants. Each node can have one or more edges emanating from it, representing one or more communications from the node to one or more other nodes. Each node also may have one or more edges terminating on it, representing inbound streams to the node.

The humanoid 705 can monitor and model the communications in the conversation by dynamically constructing the nodal graph 700. Alternatively, the humanoid 705 can monitor and model the communications in the conversation by dynamically constructing a data table from which another software process may construct the nodal graph 700. In an example embodiment, the humanoid 705 can cause the nodal graph 700 to be displayed to a person observing or participating in the conversation (e.g., via a display on a computing device) so that the person can see information regarding the conversation, including, e.g., a current status. The nodal graph 700 may include colors, icons, or other features to provide additional context regarding the conversation. For example, a node for the humanoid 705 may be color coded to indicate whether the humanoid 705 is awaiting information to proceed with a next action. Similarly edges within the nodal graph may be color coded to indicate whether corresponding communications include a statement, question, or answer.

For example, following the example from FIG. 6 described above, the nodal graph 700 can model electronic communications in a conversation to provide customer support in connection with an RMA customer support process. The nodal graph 700 can begin at a top left, with the humanoid 705 sending a communication 722 to PersonA 710 (e.g., a customer) to request a shipping address. PersonA 710 does not have the shipping address, so they send a communication 724 to PersonB 715, with a copy to (or otherwise including) the humanoid 705, asking PersonB 715 to provide the shipping address to the humanoid 705. PersonB 715 replies to the communication 724 by sending a communication 726 to the humanoid 705, with a copy to (or otherwise including) PersonA 710 and PersonC 720, with the shipping address.

PersonC 720 then asks, in a communication 728, "Can we get a Field Engineer?" but this is an undirected message, meaning that it is not directed "to" any particular conversation participant. For example, the communication 728 may not include a salutation and may include multiple conversation participants on a "to:" line of the communication 728. The humanoid 705 is configured to analyze the communication 728 and determine whether to ignore or respond to the communication 728, either by taking action, sending a communication, or otherwise. For example, the humanoid 705 can determine not to respond to a communication if the communication is not directed to the humanoid 705, does not pose any questions the humanoid 705 can answer, and does not include any information requested by the humanoid 705 or otherwise resolving any open issues being addressed by the humanoid 705.

Here, the humanoid 705 can determine to respond to the communication 728 because, while the communication 728 is not directed to the humanoid 705 (or any other particular conversation participant), the humanoid 705 can determine that the communication 728 includes a question for which the humanoid 705 knows an answer. Therefore, the humanoid 705 can send a communication 730 to PersonC 720 with a copy to (or otherwise including) PersonA 710 and PersonB 715, with the answer. For example, the humanoid 705 can provide PersonC 720 (and PersonA 710 and PersonB 715), via the communication 730, a link for a form that can be filled out to get a field engineer.

The humanoid 705 can identify answers to queries, for example, from other communications in the conversation, or in other conversations, or from a data store that includes general information or application-specific information. For example, the humanoid 705 can determine answers from one or more machine learning models trained for a particular customer support or other matter and/or one or more machine learning models trained for the conversation. In an example embodiment, the humanoid 705 can be configured to provide answers to queries even if one or more other participants in the conversation already has provided an answer. For example, if PersonB 715 had provided an answer with different (potentially incorrect, incomplete, or otherwise inferior) information than the information known by the humanoid 705 to be the answer, the humanoid 705 can determine to interject and respond with the information known by the humanoid 705.

PersonC 720 sends a communication 732 to the humanoid 705, PersonA 710, and PersonB 715 to say, "thanks!" or otherwise acknowledge receipt of the answer. Furthering the conversation, PersonC 720 then sends a communication 734, asking PersonD 725 if they can ensure that the field engineer is granted access at a security gate. PersonC 720 responds to everyone (i.e., the humanoid 705, PersonA 710, PersonB 715, and PersonC 720) with a communication 736, asking, "Which site?"

The communication 736 is undirected, meaning that it is not directed "to" any particular conversation participant. For example, the communication 736 may not include a salutation and may include multiple conversation participants on a "to:" line of the communication 736. The humanoid 705 is configured to analyze the communication 736 and determine whether to ignore or respond to the communication 736, either by taking action, sending a communication, or otherwise. For example, the humanoid 705 can determine not to respond to a communication if the communication is not directed to the humanoid 705, does not pose any questions the humanoid 705 can answer, and does not include any information requested by the humanoid 705 or otherwise resolving any open issues being addressed by the humanoid 705. Here, the humanoid 705 can determine to respond to the communication 736 because, while the communication 736 is not directed to the humanoid 705 (or any other particular conversation participant), the humanoid 705 can determine that the communication 736 includes a question for which the humanoid 705 knows the answer. For example, the humanoid 705 can send a communication 738 to PersonA 710, PersonB 715, PersonC 720, and PersonD 725, to provide the address previously provided by PersonB 715 in the communication 726.

As would be recognized by a person of ordinary skill in the art, the nodal graph 700 and the customer support process depicted in connection therewith are illustrative and should not be construed as being limiting in any way. Many suitable variations for the nodal graph 700 would be apparent to a person of ordinary skill in the art. In particular, additional, less, or different features may be included, and the information may be organized in a different format, in alternative example embodiments. In addition, it should be understood that the techniques disclosed herein can be used in connection with other customer service and non-customer service related communications beyond those described herein without departing from the spirit or scope of this disclosure.

Figure 8:
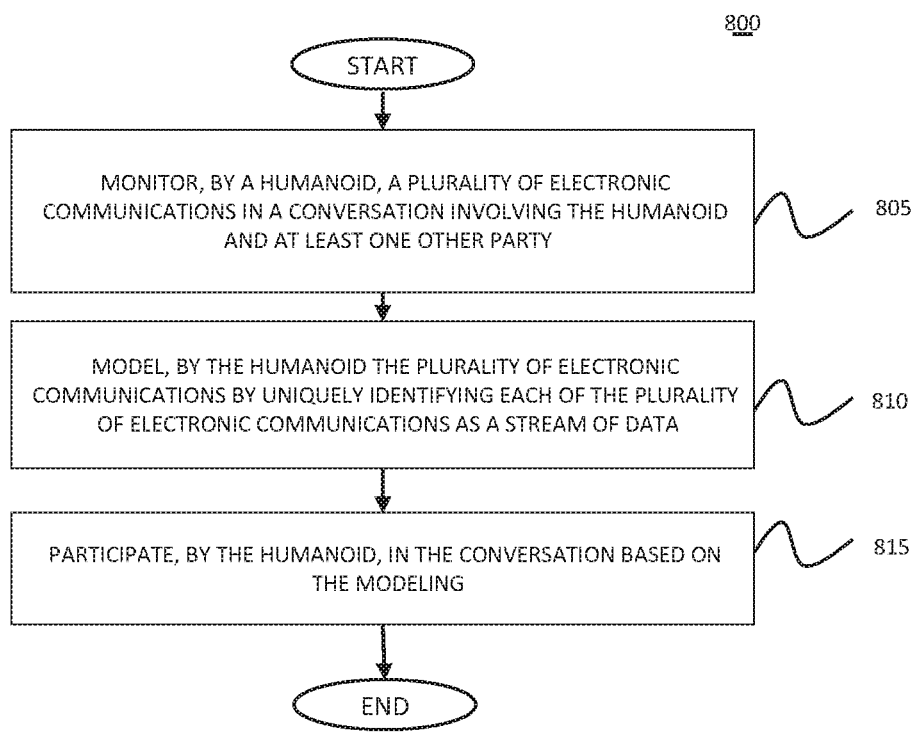
FIG. 8 is a flow chart of a method for modeling communication data streams for multi-party conversations involving a humanoid, according to an example embodiment.

Turning now to FIG. 8, a method 800 is disclosed for modeling communication data streams for multi-party conversations involving a humanoid, according to an example embodiment. The method 800 may be implemented by a humanoid, such as one of the humanoids described above. The method 800 begins in step 805 in which the humanoid monitors a plurality of electronic communications in a conversation involving the humanoid and at least one other party. For example, each other party can be a person, machine, or computer executed process (e.g., a humanoid), and the electronic communications can include one or more emails, instant messages, text messages, posts on webpages (e.g., in a discussion forum), chats, voice communications (e.g., involving speech, speech-to-text transcription, and/or text-to-speech transcription), and/or any other types of communications exchanged via an electronic medium. Each electronic communication may be directed "to:" the humanoid or as a copy (for example as a "cc:" or "bcc:") to the humanoid. For example, the humanoid may monitor or "eavesdrop" on electronic communications between a first person and a second person, which are not specifically directed to the humanoid.

In step 810, the humanoid models the electronic communications by uniquely identifying each of the electronic communications as a stream of data. For example, the humanoid can model the communications in a data table, nodal graph, or other structure. In an example embodiment, the humanoid can dynamically construct, or enable to be constructed by another software process, the data table, nodal graph, or other structure, as electronic communications are added to the conversation. In step 815, the humanoid participates in the conversation based on the modeling. For example, the humanoid may determine, based on the modeling, whether to interject in the conversation with a response or other action.

Figure 9:
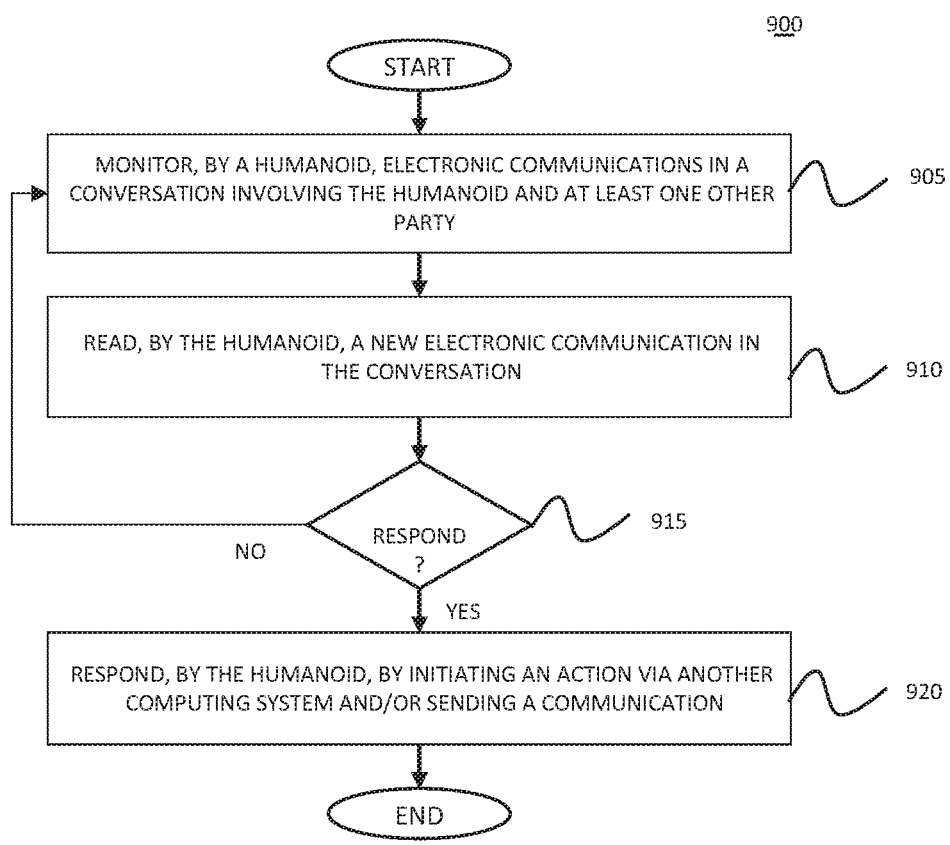
FIG. 9 is a flow chart of a method for participating, by a humanoid, in multi-party conversations, according to an example embodiment.

Turning now to FIG. 9, a method 900 is disclosed for participating, by a humanoid, in multi-party conversations, according to an example embodiment. The method 900 may be implemented by a humanoid, such as one of the humanoids described above. The method 900 begins in step 905 in which the humanoid monitors electronic communications in a conversation involving the humanoid and at least one other party. For example, each other party can be a person, machine, or computer executed process (e.g., a humanoid), and the electronic communications can include one or more emails, instant messages, text messages, posts on webpages (e.g., in a discussion forum), chats, voice communications (e.g., involving speech, speech-to-text transcription, and/or text-to-speech transcription), and/or any other types of communications exchanged via an electronic medium. Each electronic communication may be directed "to:" the humanoid or as a copy (for example as a "cc:" or "bcc:") to the humanoid. For example, the humanoid may observe or "eavesdrop" on electronic communications between a first person and a second person, which are not specifically directed to the humanoid.

In step 910, the humanoid observes a new electronic communication in the conversation. In an example embodiment, the humanoid is always "listening" for new communications, and when a new or "unheard" communication is observed by the humanoid, the humanoid can determine whether the communication is a first communication in a new conversation or a new communication in an existing conversation. For example, the humanoid can consider factors, such as identities of the communication participants, any subject line or header for the communication, content within the communication, a time of the communication, etc., to determine whether a particular communication belongs to an existing conversation.

In step 915, the humanoid determines whether to respond to the new electronic communication. For example, the humanoid can determine whether to respond, e.g., by taking an action, sending a communication, or otherwise. For example, the humanoid can determine to respond to a communication if the communication is directed to the humanoid, poses one or more questions the humanoid can answer, or includes any information requested by the humanoid or otherwise resolving any open issues being addressed by the humanoid.

If the humanoid determines in step 915 to respond to the new electronic communication, then the method 900 proceeds to step 920 in which the humanoid responds to the new electronic communication by taking an action or sending a communication. For example, the humanoid can initiate an action via an another computing system in a network of the humanoid or in a network external to the humanoid to address an issue raised by, or corresponding to information in, the new electronic communication. In addition, or in the alternative, the humanoid can send a communication, e.g., to one or more other participants in the conversation and/or another person, machine, or entity, in response to the new electronic communication.

Figure 10:
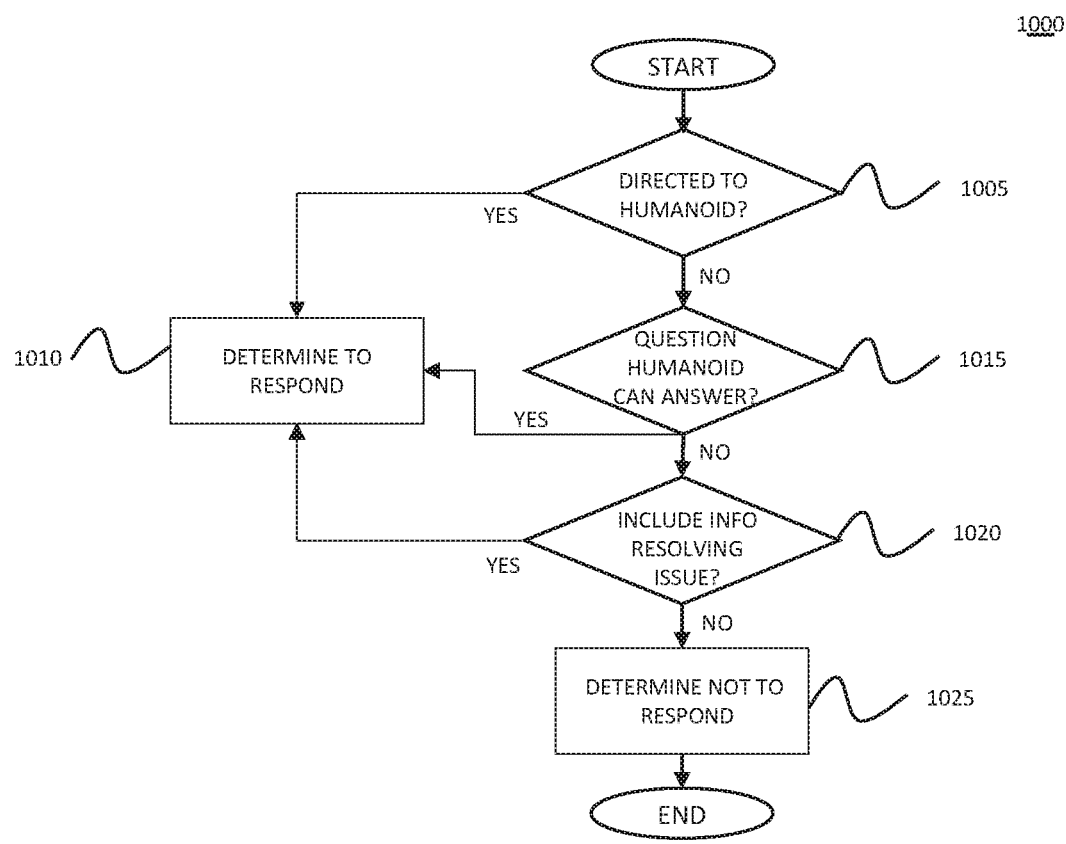
FIG. 10 is a flow chart of a method for determining, by a humanoid, whether to respond in a multi-party conversation, according to an example embodiment.

Turning now to FIG. 10, a method 1000 is disclosed for determining, by a humanoid, whether to respond to an electronic communication in a multi-party conversation, according to an example embodiment. The method 1000 may be implemented by a humanoid, such as one of the humanoids described above. The method 1000 begins in step 1005, where the humanoid determines whether the electronic communication is directed to the humanoid. If the humanoid determines in step 1005 that the electronic communication is directed to the humanoid, then the method 1000 continues to step 1010 in which the humanoid determines to respond to the electronic communication. For example, the humanoid may, but does not have to, be configured to respond to all communications that are directed specifically to the humanoid.

If the humanoid determines in step 1005 that the electronic communication is not directed to the humanoid, then the method 1000 continues to step 1015 in which the humanoid determines whether the electronic communication includes a question that the humanoid can answer. If the humanoid determines in step 1015 that the electronic communication includes a question that the humanoid can answer, then the method 1000 continues to step 1010 in which the humanoid determines to respond to the electronic communication. For example, while the electronic communication is not directed specifically to the humanoid, the humanoid may be configured to interject to provide an answer to a question posed in the electronic communication. In certain example embodiments, the humanoid may be configured to provide the answer even if another participant in the conversation already has provided an answer with different information. For example, if the humanoid determines that the provided answer is incorrect, incomplete, or otherwise inferior, then the humanoid can interject with a correct, complete answer.

If the humanoid determines in step 1015 that the electronic communication does not include a question that the humanoid can answer, then the method 1000 continues to step 1020 in which the humanoid determines whether the electronic communication includes information resolving an open issue. For example, the humanoid can determine whether the electronic communication includes information sought by the humanoid or another participant or internal or external system. If the humanoid determines in step 1020 that the electronic communication includes information resolving an open issue, then the method 1000 continues to step 1010 in which the humanoid determines to respond to the electronic communication. For example, the humanoid may respond to the electronic communication by sending an electronic communication to one of the conversation participants to acknowledge receipt of the information in the electronic communication and/or to provide the information to another conversation participant, and/or the humanoid may use the information to initiate an action within its own network or via an external network. If the humanoid determines in step 1020 that the electronic communication does not include information resolving an open issue, then the method 1000 continues to step 1025 in which the humanoid determines not to respond to the electronic communication.

As would be recognized by a person of skill in the art, the steps associated with the methods of the present disclosure, including method 800, method 900, and method 1000, may vary widely. Steps may be added, removed, altered, combined, and reordered without departing from the spirit or the scope of the present disclosure. Therefore, the example methods are to be considered illustrative and not restrictive, and the examples are not to be limited to the details given herein but may be modified within the scope of the appended claims.

Figure 11:
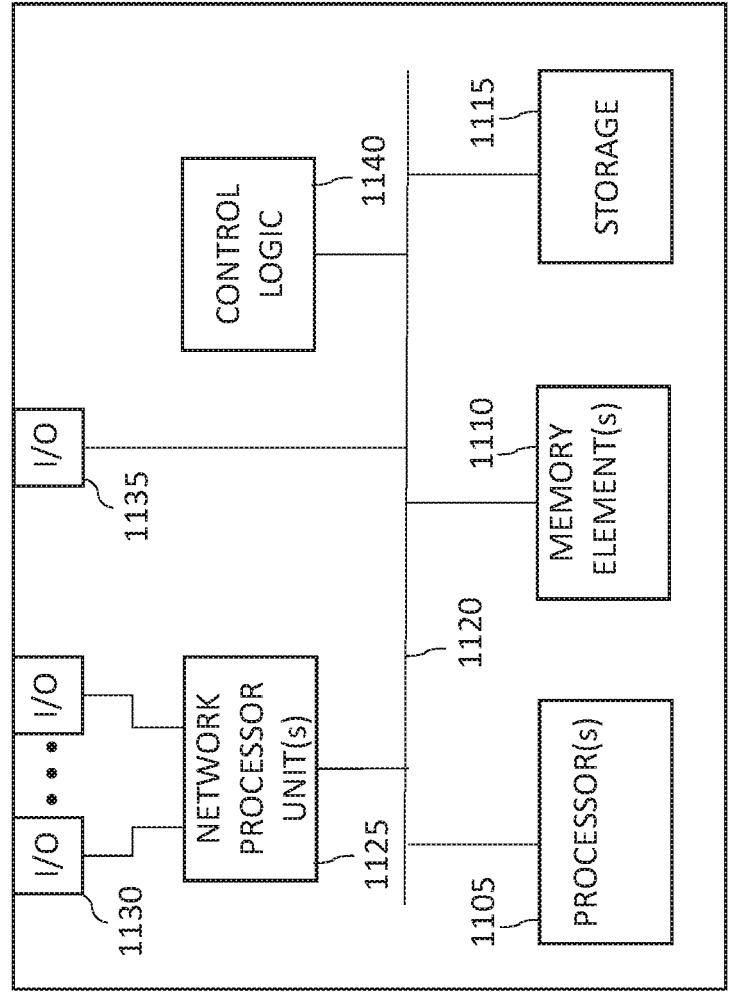
FIG. 11 is a block diagram of a computing device configured to perform the operations of a humanoid system to model communication data streams in multi-party conversations, according to an example embodiment.

Referring to FIG. 11, FIG. 11 illustrates a hardware block diagram of a computing device 1100 that may perform functions associated with operations discussed herein in connection with the techniques depicted in FIGS. 1-10. In various example embodiments, a computing device, such as computing device 1100 or any combination of computing devices 1100, may be configured as any entity/entities as discussed for the techniques depicted in connection with FIGS. 1-10 in order to perform operations of the various techniques discussed herein.

In at least one embodiment, computing device 1100 may include one or more processor(s) 1105, one or more memory element(s) 1110, storage 1115, a bus 1120, one or more network processor unit(s) 1125 interconnected with one or more network input/output (I/O) interface(s) 1130, one or more I/O interface(s) 1135, and control logic 1140. In various embodiments, instructions associated with logic for computing device 1100 can overlap in any manner and are not limited to the specific allocation of instructions and/or operations described herein.

In at least one embodiment, processor(s) 1105 is/are at least one hardware processor configured to execute various tasks, operations and/or functions for computing device 1100 as described herein according to software and/or instructions configured for computing device. Processor(s) 1105 (e.g., a hardware processor) can execute any type of instructions associated with data to achieve the operations detailed herein. In one example, processor(s) 1105 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 1110 and/or storage 1115 is/are configured to store data, information, software, and/or instructions associated with computing device 1100, and/or logic configured for memory element(s) 1110 and/or storage 1115. For example, any logic described herein (e.g., control logic 1140) can, in various embodiments, be stored for computing device 1100 using any combination of memory element(s) 1110 and/or storage 1115. Note that in some embodiments, storage 1115 can be consolidated with memory element(s) 1110 (or vice versa), or can overlap/exist in any other suitable manner.

In at least one embodiment, bus 1120 can be configured as an interface that enables one or more elements of computing device 1100 to communicate in order to exchange information and/or data. Bus 1120 can be implemented with any architecture designed for passing control, data and/or information between processors, memory elements/storage, peripheral devices, and/or any other hardware and/or software components that may be configured for computing device 1100. In at least one embodiment, bus 1120 may be implemented as a fast kernel-hosted interconnect, potentially using shared memory between processes (e.g., logic), which can enable efficient communication paths between the processes.

In various embodiments, network processor unit(s) 1125 may enable communication between computing device 1100 and other systems, entities, etc., via network I/O interface(s) 1130 to facilitate operations discussed for various embodiments described herein. In various embodiments, network processor unit(s) 1125 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1130 can be configured as one or more Ethernet port(s), Fibre Channel ports, and/or any other I/O port(s) now known or hereafter developed. Thus, the network processor unit(s) 1125 and/or network I/O interfaces 1130 may include suitable interfaces for receiving, transmitting, and/or otherwise communicating data and/or information in a network environment.

I/O interface(s) 1135 allow for input and output of data and/or information with other entities that may be connected to computer device 1100. For example, I/O interface(s) 1135 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1140 can include instructions that, when executed, cause processor(s) 1105 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1140) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1110 and/or storage 1115 can store data, software, code, instructions (e.g., processor instructions), logic, parameters, combinations thereof, and/or the like used for operations described herein. This includes memory element(s) 1110 and/or storage 1115 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, in one form, a computer-implemented method includes monitoring, by a humanoid, a plurality of electronic communications in a conversation involving the humanoid and at least one other party. The humanoid includes a computer executed process that mimics human dialog. The humanoid models the plurality of electronic communications by uniquely identifying each of the plurality of electronic communications as a stream of data. The humanoid participates in the conversation based on the modeling.

For example, the modeling can include representing the conversation as a nodal graph that includes a plurality of segments, each of the plurality of segments corresponding to a respective one of the plurality of electronic communications in the conversation. In addition, or in the alternative, modeling can include storing, in a database, data regarding the conversation according to a schema comprising a unique identifier for each stream of data, each unique identifier being associated in the database with another unique identifier associated with the conversation. In an example embodiment, the humanoid can cause information regarding a most recent electronic communication to be displayed on a computer display.

Participating in the conversation may include, for example, determining whether to ignore or respond to a particular electronic communication in the plurality of electronic communications. For example, this may include determining whether the particular electronic communication supports initiating an action and, if so, initiating the action via another computing system. In addition, or in the alternative, if the particular electronic communication includes a question that is not directed to the humanoid, the humanoid can determine to respond to the particular electronic communication by answering the question, e.g., based at least on information in at least one of the plurality of electronic communications other than the particular electronic communication.

In another form, a computer-implemented method includes participating, by a humanoid, in a conversation with at least a first party and a second party, where the conversation includes at least one electronic communication. The humanoid models the electronic communication(s) by uniquely identifying each of the electronic communication(s) as a stream of data. The humanoid determines whether to respond to a new electronic communication in the conversation based on the modeling and responds (or doesn't respond) based on that determination.

In another form, one or more non-transitory computer readable storage media include instructions that, when executed by at least one processor, are operable to monitor a plurality of electronic communications in a conversation involving a humanoid and at least one other party. The instructions, when executed, are further operable to model the plurality of electronic communications by uniquely identifying each of the plurality of electronic communications as a stream of data in a data structure comprising a data table or nodal graph. The instructions, when executed, are further operable to participate in the conversation based on the modeling.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
monitoring, by a humanoid, a plurality of electronic communications in a conversation involving the humanoid and at least one participant, the humanoid comprising a computer executed process that mimics human dialog;
modeling, by the humanoid, the conversation, wherein modeling the conversation includes dynamically constructing a model, the model including a plurality of edges and a plurality of nodes, wherein each edge visually represents an electronic communication of the plurality of electronic communications and each node visually represents a participant of the at least one participant involved in each of the plurality of electronic communications, wherein an edge emanating from a particular node represents an electronic communication from a participant associated with the particular node, wherein an edge terminating on the particular node represents an inbound electronic communication to the participant associated with the particular node, wherein the edge emanating from the particular node is visually distinct from the edge terminating on the particular node, wherein the conversation is associated with a unique conversation identifier, wherein each of the plurality of electronic communications in the conversation is associated with a unique communication identifier and the unique conversation identifier, wherein a visual representation of each of the plurality of electronic communications is added to the model when a corresponding electronic communication associated with the unique conversation identifier is added to the conversation, and wherein the model visually illustrates a progression of interconnected paths corresponding to the plurality of electronic communications through the conversation; and participating, by the humanoid, in the conversation based on the modeling.

2. The method of claim 1, wherein modeling comprises representing the conversation as a nodal graph comprising a plurality of segments, each of the plurality of segments corresponding to a respective one of the plurality of electronic communications in the conversation.

3. The method of claim 1, wherein modeling comprises storing, in a database, data regarding the conversation according to a schema comprising the unique communication identifier for each electronic communication, each unique communication identifier being associated in the database with the unique conversation identifier.

4. The method of claim 1, wherein modeling comprises monitoring, by the humanoid, a plurality of electronic communications in a conversation involving the humanoid and a plurality of different people.

5. The method of claim 1, further comprising causing, by the humanoid, information regarding a most recent electronic communication in the conversation to be displayed on a computer display.

6. The method of claim 1, wherein participating comprises determining whether to ignore or respond to a particular electronic communication in the plurality of electronic communications.

7. The method of claim 6, wherein determining comprises determining whether the particular electronic communication supports initiating an action and, if so, initiating the action via another computing system.

8. The method of claim 6, wherein the particular electronic communication comprises a question that is not directed to the humanoid, and the humanoid determines to respond to the particular electronic communication by answering the question.

9. The method of claim 8, wherein the humanoid answers the question based at least on information in at least one of the plurality of electronic communications other than the particular electronic communication.

10. The method of claim 6, wherein the particular electronic communication comprises information to be used by the humanoid to resolve an open issue, and
wherein participating comprises resolving the open issue.

11. The method of claim 10, wherein resolving the open issue comprises at least one of sending an answer to the at least one participant, and initiating an action via another computer system.

12. The method of claim 1, wherein participating comprises:
monitoring one or more new electronic communications that are added to the conversation; and
determining for a particular one of the one or more new electronic communications, whether to respond to the particular one of the one or more new electronic communications.

13. A computer-implemented method comprising:
participating, by a humanoid, in a conversation with at least a first participant and a second participant, the conversation comprising at least one electronic communication, the humanoid comprising a computer executed process that mimics human dialog;
modeling, by the humanoid, the conversation, wherein modeling the conversation includes dynamically constructing a model, the model including a plurality of edges and a plurality of nodes, wherein each edge visually represents an electronic communication of the at least one electronic communication and each node visually represents a participant involved in each of the at least one electronic communication, wherein an edge emanating from a particular node represents an electronic communication from a participant associated with the particular node, wherein an edge terminating on the particular node represents an inbound electronic communication to the participant associated with the particular node, wherein the edge emanating from the particular node is visually distinct from the edge terminating on the particular node, wherein the conversation is associated with a unique conversation identifier, wherein each of the at least one electronic communication in the conversation is associated with a unique communication identifier and the unique conversation identifier, wherein a visual representation of each of the at least one electronic communication is added to the model when a corresponding electronic communication associated with the conversation identifier is added to the conversation, and wherein the model visually illustrates a progression of interconnected paths corresponding to the at least one electronic communication through the conversation;
determining, by the humanoid, whether to respond to a new electronic communication in the conversation based on the modeling; and
responding, by the humanoid, to the new electronic communication based on the determining.

14. The method of claim 13, wherein modeling comprises representing the conversation as a nodal graph comprising a plurality of segments, each of the plurality of segments corresponding to a respective electronic communication in the conversation.

15. The method of claim 13, wherein modeling comprises storing, in a database, data regarding the conversation according to a schema comprising the unique communication identifier for each of the at least one electronic communication, each unique communication identifier being associated in the database with the unique conversation identifier.

16. The method of claim 13, wherein participating further comprises participating in at least one other conversation, each of the at least one other conversation comprising at least one other electronic communication, and wherein modeling further comprises uniquely identifying each of the at least one other electronic communication as a stream of data, each stream of data being associated with a corresponding one of the conversation or the at least one other conversation.

17. The method of claim 13, wherein determining comprises determining whether the new electronic communication supports initiating an action and, if so, initiating the action via another computing system.

18. The method of claim 13, wherein the new electronic communication comprises a question that is not directed to the humanoid, and the humanoid determines to respond to the new electronic communication by answering the question.

19. The method of claim 18, wherein the humanoid answers the question based on information in at least one of the at least one electronic communication.

20. One or more non-transitory computer readable storage media comprising instructions that, when executed by at least one processor, are operable to:
 monitor a plurality of electronic communications in a conversation involving a humanoid and at least one participant, the humanoid comprising a computer executed process that mimics human dialog;
 model the conversation by dynamically constructing a model, the model including a plurality of edges and a plurality of nodes, wherein each edge visually represents an electronic communication of the plurality of electronic communications and each node visually represents a participant involved in each of the plurality of electronic communications, wherein an edge emanating from a particular node represents an electronic communication from a participant associated with the particular node, wherein an edge terminating on the particular node represents an inbound electronic communication to the participant associated with the particular node, wherein the edge emanating from the particular node is visually distinct from the edge terminating on the particular node, wherein the conversation is associated with a unique conversation identifier, wherein each of the plurality of electronic communications in the conversation is associated with a unique communication identifier and the conversation identifier, wherein a visual representation of each of the plurality of electronic communications is added to the model when a corresponding electronic communication associated with the unique conversation identifier is added to the conversation, and wherein the model visually illustrates a progression of interconnected paths corresponding to the plurality of electronic communications through the conversation in a data structure comprising a data table or nodal graph; and
 participate in the conversation based on the modeling.

21. The one or more non-transitory computer readable storage media of claim 20, wherein the instructions further cause the processor to represent the conversation as the nodal graph comprising a plurality of segments, each of the plurality of segments corresponding to a respective one of the plurality of electronic communications in the conversation.

22. The one or more non-transitory computer readable storage media of claim 20, wherein the instructions further cause the processor to store, in the data table, data regarding the conversation according to a schema comprising the unique communication identifier for each stream of data, each unique communication identifier being associated in the data table with the unique conversation identifier.

* * * * *